No. 740,591. PATENTED OCT. 6, 1903.
D. P. SANDERS.
MOTOR VEHICLE.
APPLICATION FILED FEB. 25, 1903.
NO MODEL. 7 SHEETS—SHEET 1.

Witnesses
David P. Sanders, Inventor
by
Attorneys

No. 740,591. PATENTED OCT. 6, 1903.
D. P. SANDERS.
MOTOR VEHICLE.
APPLICATION FILED FEB. 25, 1903.
NO MODEL. 7 SHEETS—SHEET 2.

Witnesses
E. F. Stewart
Jno. E. Parker

David P. Sanders, Inventor
by C. A. Snow & Co.
Attorneys

No. 740,591. PATENTED OCT. 6, 1903.
D. P. SANDERS.
MOTOR VEHICLE.
APPLICATION FILED FEB. 25, 1903.
NO MODEL. 7 SHEETS—SHEET 6.

Witnesses
E. K. Stewart
Jno. E. Parker

David P. Sanders Inventor
by C. A. Snow & Co.
Attorneys

No. 740,591. PATENTED OCT. 6, 1903.
D. P. SANDERS.
MOTOR VEHICLE.
APPLICATION FILED FEB. 25, 1903.
NO MODEL. 7 SHEETS—SHEET 7.

Witnesses
David P. Sanders, Inventor
by C. A. Snow & Co.
Attorneys

No. 740,591. Patented October 6, 1903.

UNITED STATES PATENT OFFICE.

DAVID P. SANDERS, OF WILLIAMSPORT, PENNSYLVANIA.

MOTOR-VEHICLE.

SPECIFICATION forming part of Letters Patent No. 740,591, dated October 6, 1903.

Application filed February 25, 1903. Serial No. 145,051. (No model.)

*To all whom it may concern:*

Be it known that I, DAVID P. SANDERS, a citizen of the United States, residing at Williamsport, in the county of Lycoming and State of Pennsylvania, have invented a new and useful Motor-Vehicle, of which the following is a specification.

This invention relates to certain improvements in motor-vehicles.

The principal object of the invention is to provide a novel and powerful form of motor-vehicle which may be used for traction purposes for hauling cars and the like in mines or other places and which may be employed, in connection with a vehicle-frame of proper size, for use as a motor for street-cars and other vehicles.

A further object of the invention is to provide a motor-vehicle in which a continuously-operated motor mechanism turning constantly in one direction may be readily connected to both sets of vehicle-wheels to travel the vehicle in either direction without necessitating the stoppage and reversal of the motor.

A still further object of the invention is to provide a novel form of supporting-frame for the reception and support of all of the movable parts and to so construct and arrange the frame as to provide for the ready assemblement of its parts.

A still further object of the invention is to provide a motor-vehicle in which all of the movable elements shall be shielded from observation and the entrance of dirt and dust prevented.

With these and other objects in view the invention consists in the novel construction and arrangement of parts hereinafter described, and illustrated in the accompanying drawings and particularly pointed out in the appended claims, it being understood that various changes in the form, proportions, size, and minor details of the structure may be made without departing from the spirit or sacrificing any of the advantages of the invention.

Figure 1:
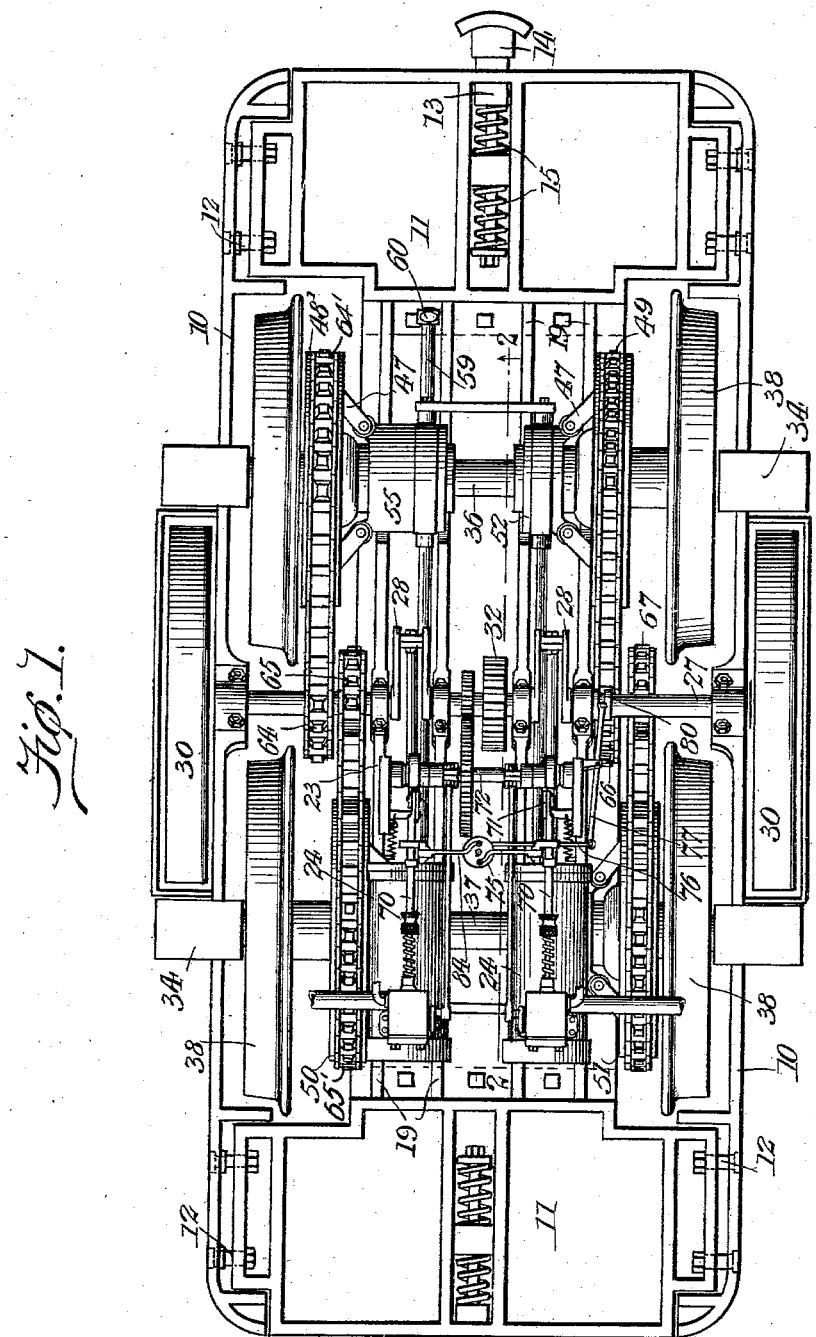
Figure 2:
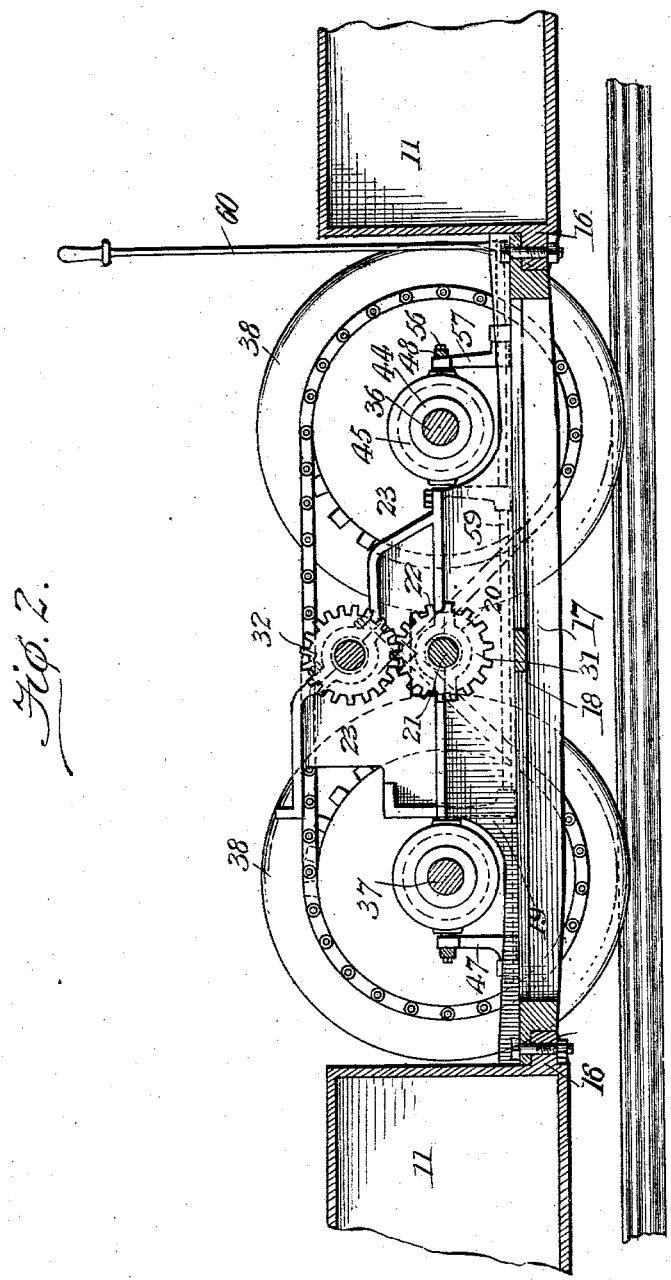
Figure 3:
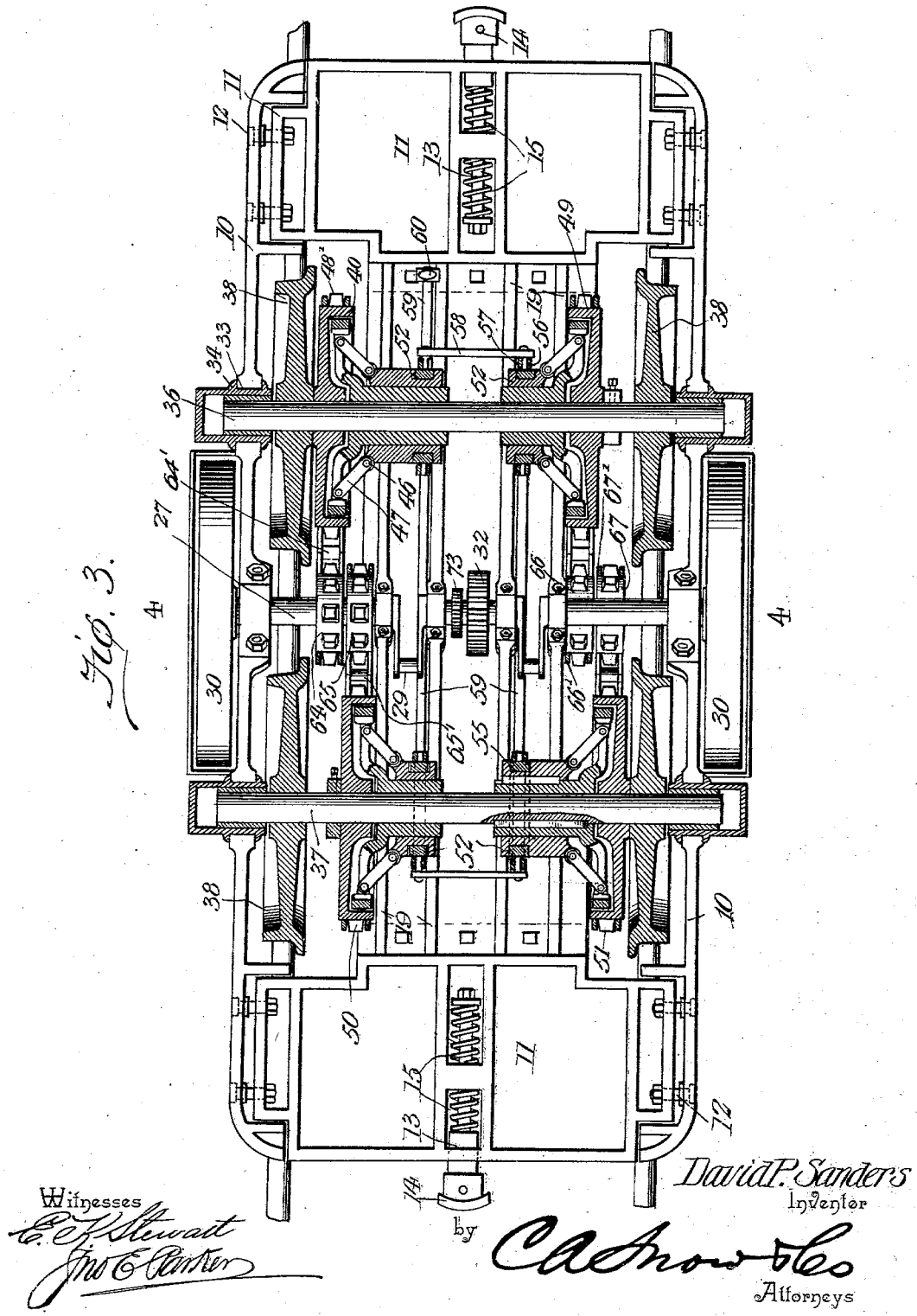
Figure 4:
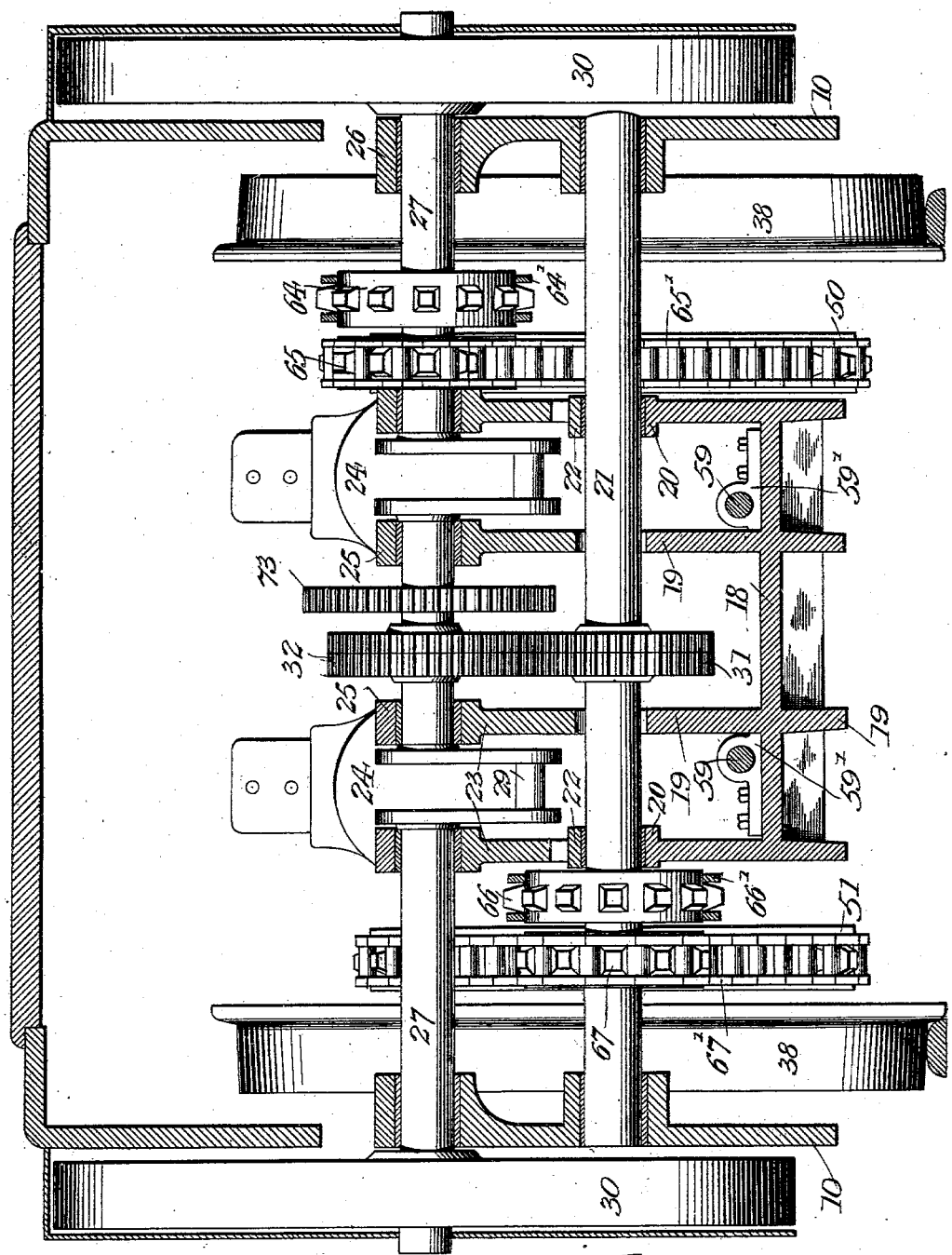
Figure 5:
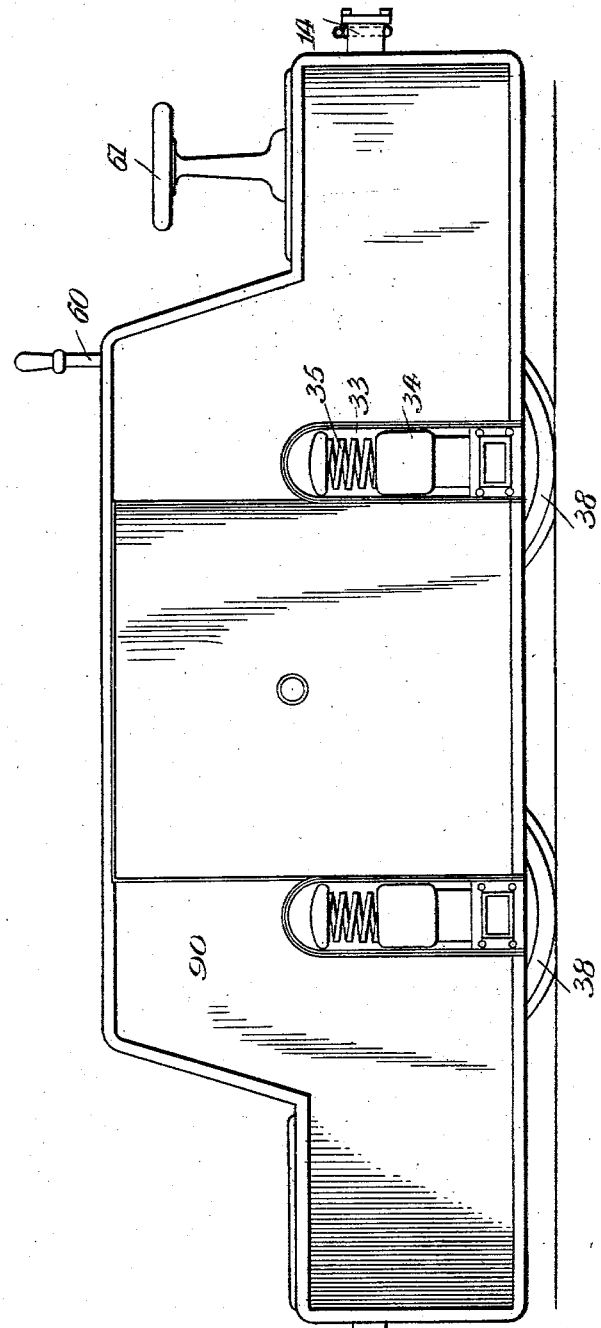
Figure 6:
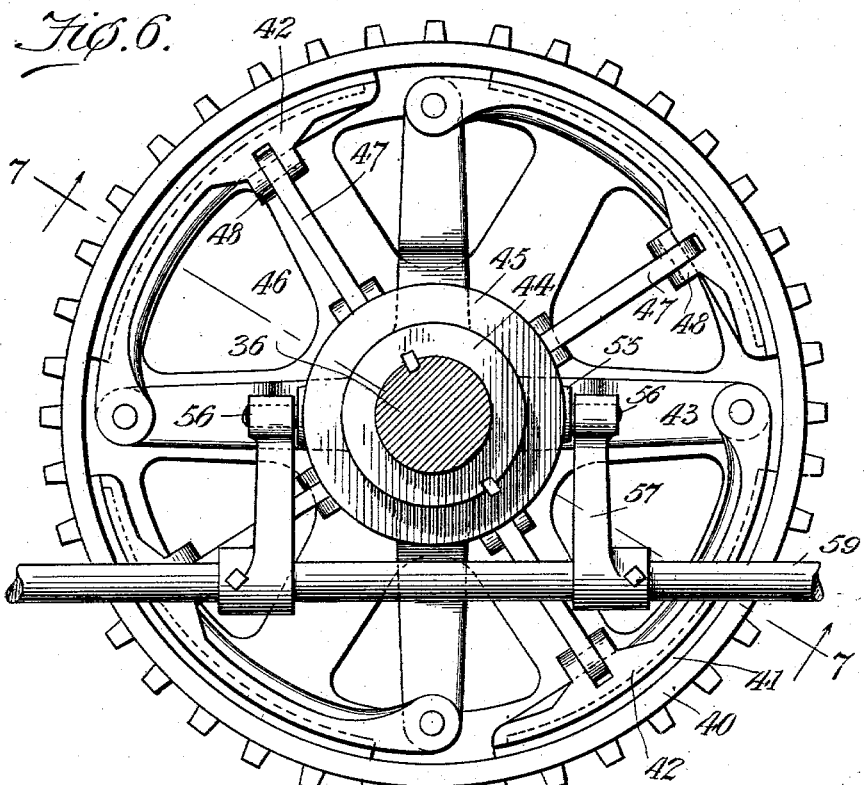
Figure 7:
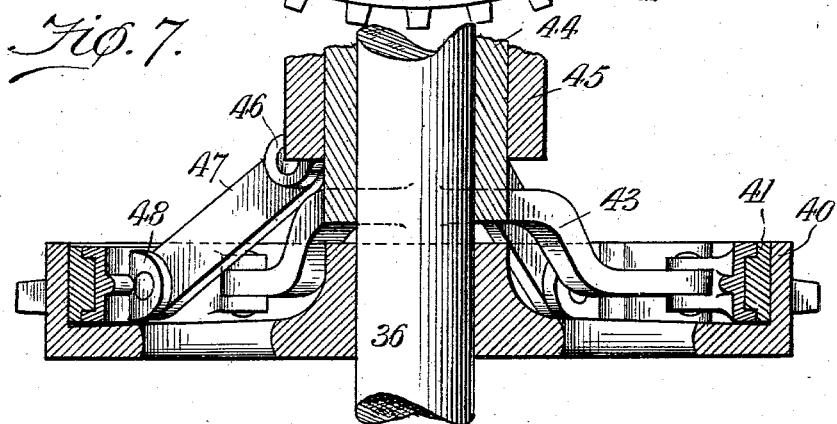
Figure 8:
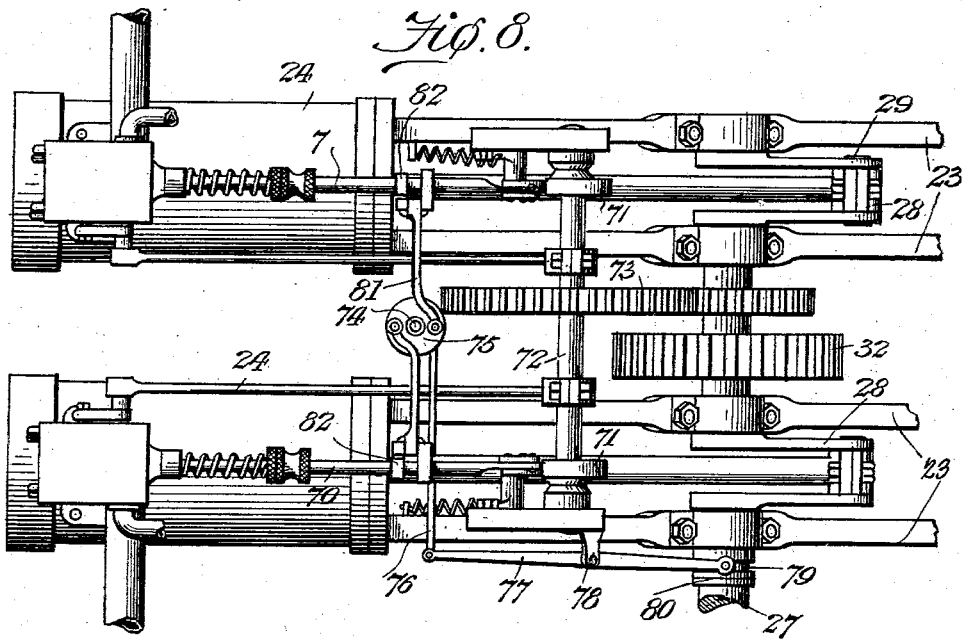
Figure 9:
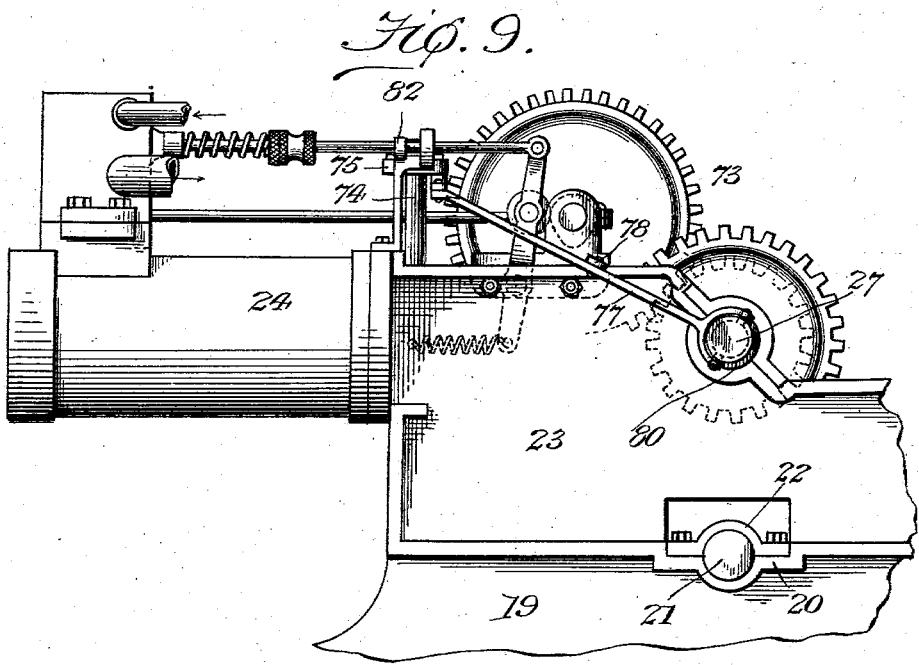

In the accompanying drawings, Figure 1 is a plan view of a motor-vehicle constructed in accordance with the invention. Fig. 2 is a longitudinal sectional elevation of the same on the line 2 2 of Fig. 1. Fig. 3 is a sectional plan view of the device on the line 3 3 of Fig. 2, the storage-tanks being removed. Fig. 4 is a transverse sectional elevation of the device on the line 4 4 of Fig. 3, this view being drawn to a somewhat larger scale. Fig. 5 is a side elevation of the motor-vehicle, illustrating the arrangement of the inclosing casing. Fig. 6 is a sectional elevation through one of the counter-shafts, illustrating the construction of a clutch which it is preferred to employ. Fig. 7 is a transverse sectional view on the line 7 7 of Fig. 6. Fig. 8 is a plan view of the gas-engines employed for propelling the vehicle. Fig. 9 is a side elevation of the mechanism, illustrating the construction and arrangement of the gas-engine.

Similar numerals of reference are employed to indicate corresponding parts throughout the several figures of the drawings.

The general frame of the vehicle or car comprises opposite side members 10, adapted at their opposite ends to interfit with transversely-disposed platform members 11, the members being united by securing-bolts 12. The platform members 11 are webbed and are provided with suitable guides for the reception of draw-heads 13, terminating in couplings 14 for convenience in connecting the vehicle to a car or cars to be propelled, and the stem of the draw-head is surrounded by opposing springs 15, arranged in the usual manner, the springs taking up any shock which may result from the stopping or starting of a train of cars.

Between the opposite platform members, each of which is provided with a transversely-disposed flange 16, Fig. 2, is arranged a bed-plate 17 for the reception and support of an engine and the various operating members of the device. The bed-plate 17 has a horizontal flooring 18 and is provided with a plurality of spaced webs 19, the webs being vertically extended near the central portion of the frame and the outer of said webs being provided with bearings or pillow-blocks 20 for the reception of a shaft 21, which is held in place in the bearing by a cap-piece 22, bolted to the pillow-block, and suitable bearings are also provided in the side plates 10 for the reception of the extreme outer ends of said shaft.

The four webs 19 serve as supports for the webbed flange 23 of a pair of gas or other engines of which the cylinders are indicated at 24, and the outer of the engine-frame webs are recessed to facilitate the introduction of the cap-pieces 22 for the lower shaft. The several webs of the engine-frame are provided with bearings 25, and the side plates 10 are further provided with bearings for the reception of a crank-shaft 27, having two sets of cranks 28, each pair of cranks being connected in the usual manner by a wrist-pin 29. At the outer ends of the shaft 27 are balance-wheels 30 of the character ordinarily employed in explosive-engines for maintaining the engine at a regular speed while in operation. The shaft 21 is provided with a gear-wheel 31, intermeshing with a similar gear-wheel 32 on the crank-shaft, and as the latter is rotated by the engines the movement is imparted in an opposite direction to the counter-shaft 21.

The outer side plates 10 are provided with vertically-disposed guideways 33 for the reception of vertically-movable journal-boxes 34, normally held in depressed position by springs 35, of sufficient strength to support the weight of the vehicle and adapted to yield as the weight alters from increase or decrease of the load or fuel-supply and to prevent jarring due to unevenness in the trackway or road-bed. The journal-boxes 34 receive the end portions of shafts or axles 36 and 37, to each of which is secured two flanged supporting-wheels 38, adapted to a suitable trackway, and said shafts are further provided with loosely-mounted flanged disks 40, having internal friction-faces adapted to be engaged by friction clutching-shoes 41, carried by arcuate arms 42, there being any number of these arms and their size and number being varied in accordance with the size of the vehicle. At one end of each of the arms 42 is pivoted the outer end of a spider 43, having a central hub 44, rigidly secured to the shaft and rotating therewith. On the periphery of the hub 44 is mounted a ring or collar 45, feathered to the hub 44 and free for longitudinal movement thereon. This collar 45 is provided with pivot-ears 46, which are connected by links 47 to pivot-ears 48 at or near the free ends of the arms 42, and when the collar is moved in the direction of the friction-disks the latter will be firmly locked to the shafts.

Each of the friction-disks is provided with peripherally-disposed teeth forming sprocket-wheels, and for the sake of convenience the sprocket-wheels on the shaft 36 are indicated by reference-numerals 48' and 49, while those on the shaft 37 are designated by reference-numerals 50 and 51.

Each of the collars 45 is provided with an annular groove 52 for the reception of a ring 55, and at the opposite sides of each ring are pins 56, passing through elongated openings in the upper ends of spaced crank-arms 57, and the outer sets of crank-arms are connected for mutual movement by links 58. The crank-arms are rigidly secured to rock-shafts 59, having suitable bearings 59' on the bed-plate, and one of said rock-shafts is provided with an operating-crank 60, arranged near one end of the machine within convenient reach of an operator's seat 61. The arrangement is such that when the operating-lever is moved in one direction both shafts 59 are moved in the same direction, and the friction-shoes at the right-hand side of the lever will be engaged with their respective disks, while the friction-shoes at the opposite sides will be disengaged, and vice versa.

Secured to the crank-shaft 27 are the two sprocket-pinions 64 and 65, connected by link belts 64' and 65' to the sprocket-wheels 48' and 50, respectively, and on the lower counter-shaft are secured two sprocket-pinions 66 and 67, connected by link belts 66' and 67', respectively, to the sprocket-wheels 49 and 51.

The motor mechanism, which will be more fully described hereinafter, imparts continuous rotative movement in one direction to the crank-shaft 27, and this movement is imparted at the same or at different speed to the counter-shaft 21 through the connecting-gearing 32 and 31. When the operating-lever 60 is in a vertical or mid position, all of the clutching-disks are disconnected from their respective shafts, but by moving the lever in one direction or the other the clutches and sprocket-wheels at either the right or left hand side of the machine may be positively locked to the shaft and movement imparted positively to both shafts in the desired direction, so that the machine may be propelled with equal facility in both directions. In ordinary practice where a continuously-operated motor is revolved in but one direction it is usual to employ the axle or shaft at one end of the vehicle for imparting movement to the latter in one direction, while the reverse movement is accomplished by connecting the shaft or axle at the opposite end to said motor mechanism. This construction is ineffective in some cases inasmuch as the weight of the vehicle is not evenly distributed on both axles and the effective tractive force in one direction will be less than that in the other. In the present case the traction is equal in both directions of movement of the vehicle and is equally effective as a propelling agent for moving in one direction or the other.

The webbed portions of the engine-frame are provided with bolting flanges, to which may be secured the inner ends of the cylinders 24, and these may be of the usual form employed for engines of the two-cycle or four-cycle type.

The engine is provided with the usual inlet and escape ports, and in Fig. 8 is illustrated the arrangement of the mechanism for operating and controlling the exhaust. In this case the stems 70 of the exhaust-valve are provided with small rollers bearing against cams 71 on a counter-shaft 72, connected by gearing 73 to the main crank-shaft and operating at suitable intervals to open the exhaust-ports of the engine. At a suitable point between the two engines the frame is provided with a vertically-disposed stud 74, carrying a horizontal disk 75, which is connected by a rod 76 to one end of a governor-actuated lever 77. The lever is fulcrumed at an intermediate point to a bracket 78 and has a bifurcated end portion fitting in a groove 79 in a collar 80, mounted on the crank-shaft of the engine and connected to a centrifugal or other form of governor which imparts movement to the collar to an extent depending on the speed of the engine. The disk 75 is pivotally connected to the inner ends of a pair of arms 81, having suitable guides at their upper ends, and when the speed of the engine is excessive these arms 81 are projected until their outer ends come into the path of travel of collars 82, secured to the valve-stems 70, and prevent movement of the exhaust-valves until the speed of the engine is reduced.

At the platform at one end of the framework 1 are arranged suitable tanks, one for the reception of gasolene or other hydrocarbon and the other containing air under pressure, the air being forced through the hydrocarbon to form an explosive mixture for the two engines and any suitable form of carbureting apparatus being employed for the purpose, or the tanks may contain a supply of gas under pressure for operating the engines.

The platform at the opposite end of the device serves to contain a quantity of water or other fluid which is circulated in any suitable manner through the water-jackets of the gas-engine cylinders for cooling purposes.

In order to properly protect the parts from the entrance of dirt and dust the whole structure is inclosed by a casing 90, as shown in Fig. 5, and said casing may be formed of thin sheet metal, or the side frames 10 may be continued up to points above the top of the engine, if desired.

The vehicle may be made of any desired size, and while principally intended for handling cars in mines or for like purposes it may be employed for other purposes, such as in street-cars, for roadwork, and the like.

Having thus described the invention, what is claimed is—

1. In a device of the class specified, the combination with a frame, of the two sets of supporting-wheels, a motor mechanism, a shaft connected thereto and receiving motion in one direction therefrom, a counter-shaft operatively connected to the first shaft, and means for connecting each shaft to both sets of supporting-wheels to thereby impart rotative movement in either direction to said wheels.

2. In a device of the class specified, the combination with a frame, of a plurality of sets of supporting-wheels, shafts or axles carrying said wheels, a motor-shaft revolved in one direction, a counter-shaft connected to the motor-shaft and receiving movement therefrom in the opposite direction, means for connecting each shaft to both of the axles, and means for controlling the transmission of power from both shafts to permit operative movement of both axles from either the main or the counter-shaft.

3. In a device of the class specified, the combination with a frame, of the front and rear axles, supporting-wheels thereon, a motor mechanism, a main shaft receiving rotative movement therefrom in one direction, a counter-shaft connected to the main shaft and driven in an opposite direction, means for connecting each shaft to both the front and rear axles, and a clutching mechanism for controlling the operative movement from both shafts.

4. In a device of the class specified, the combination with a frame, of the front and rear axles, supporting-wheels thereon, a pair of sprocket-wheels mounted loosely on each axle, clutching means for engaging the sprocket-wheels with the axles, a main shaft revoluble in one direction, a counter-shaft receiving movement therefrom in the opposite direction, a pair of sprocket-pinions secured to each of the two shafts and operatively connected to the loose sprocket-wheels on both axles, and means for controlling the clutching mechanism whereby movement may be transmitted to both axles from either the main shaft or the counter-shaft.

5. In a device of the class specified, the combination with a frame, of the front and rear axles, supporting-wheels secured to said axles, a pair of sprocket-wheels mounted loosely on each axle, a clutching mechanism whereby one sprocket-wheel of each pair may be clutched to the axles and the other wheel of each pair disengaged therefrom, a main shaft receiving movement in one direction, a counter-shaft receiving corresponding movement in the opposite direction, a pair of sprocket-pinions secured to each shaft, link-belts connecting the pinions of the main shaft to one sprocket-wheel of each pair, and link-belts connecting the sprocket-pinions of the counter-shaft to the opposing wheels of each pair, whereby operative movement may be transmitted to both axles from the main shaft for propelling the vehicle in one direction or from the counter-shaft for propelling the vehicle in the opposite direction.

6. In a device of the class specified, the combination with a frame, of the front and rear axles, supporting-wheels mounted on said axles, a pair of sprocket-wheels mounted loosely on each axle and having clutch-faces, clutching means movable longitudinally of the axles and adapted to lock the sprocket-wheels thereto, said clutching mechanisms including two sets of collars each provided with an annular groove, a pair of parallel rock-shafts extending longitudinally of the frame of the machine, a clutch-operating lever secured to one of said rock-shafts, a plurality of crank or rocker arms secured to both rock-shafts, links connecting said cranks or rocker-arms for mutual movement, means carried by the crank or rocker arms for engaging the annular grooves, a main shaft receiving rotative movement in one direction, a counter-shaft receiving corresponding movement in the opposite direction, a pair of sprocket-pinions secured to each shaft, link belts connecting the sprocket-pinions of the main shaft to one of each pair of sprocket-wheels, and link belts connecting the sprocket-pinions of the counter-shaft to the opposing sprocket-wheels of the second pair.

7. In combination, a frame comprising opposite longitudinally-disposed side members, transversely-disposed end platforms secured to said side members, a bed-plate secured to the platforms and provided with a plurality of spaced webs, a counter-shaft and a main shaft having bearings in the frame, a pair of engines carried by the webbed portion of the bed-plate and operatively connected to the main shaft, axles supported by the side members, supporting-wheels on said axles, and means for connecting the shafts to the axles.

8. In combination, a frame comprising opposite side members, transversely-disposed platforms forming the end portions of the frame and connected to said side members, a bed-plate secured to the platforms and provided with a plurality of spaced webs, pillow-blocks carried by the webs, a counter-shaft extending transversely of the machine and adapted to bearings of which the pillow-blocks form a part, an engine-frame having webbed portions corresponding to those of the bed-plate and secured thereto, a main shaft having bearings on the engine-frame and in the side members, cylinders secured to the engine-frame and forming part of a motor mechanism, means for connecting the latter to the main shaft, gearing connecting the main and the counter shaft, a pair of sets of journal-boxes adapted to vertical guides in the side members and having actuating-springs, transversely-disposed front and rear axles adapted to said journal-boxes, supporting-wheels for the axles, and means for connecting both axles to both the main and counter shaft.

In testimony that I claim the foregoing as my own I have hereto affixed my signature in the presence of two witnesses.

DAVID P. SANDERS.

Witnesses:
J. S. LEWARS,
G. M. SONES.